UNITED STATES PATENT OFFICE.

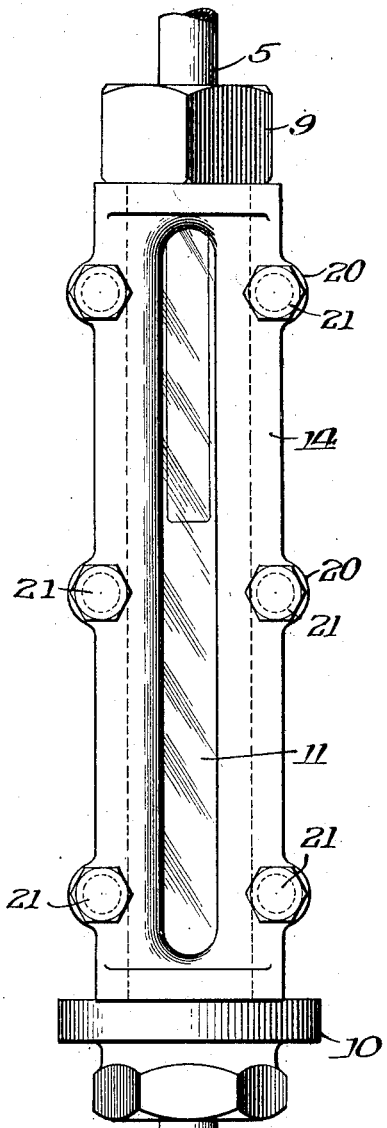
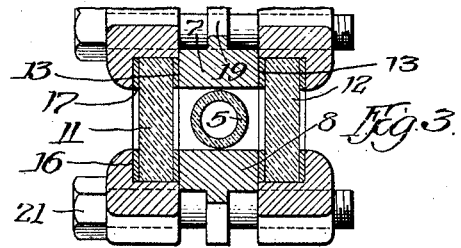
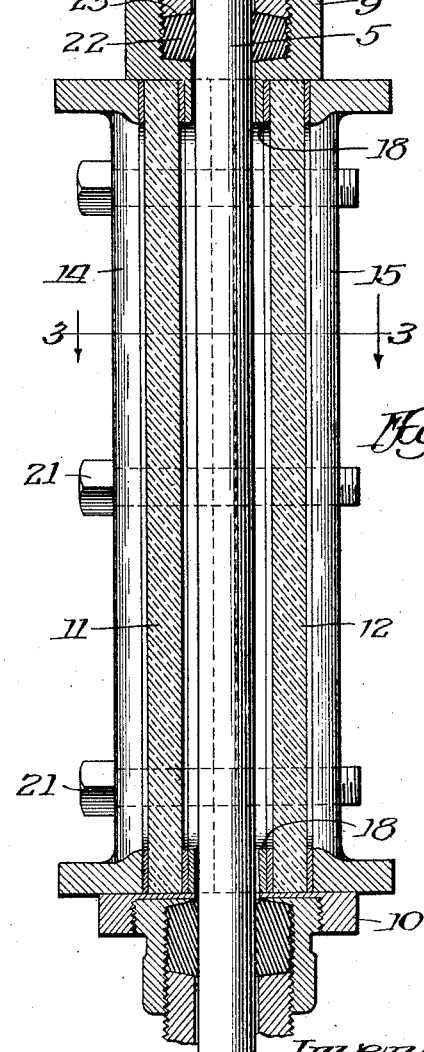

GEORGE H. SARGENT, OF CHICAGO, ILLINOIS, ASSIGNOR TO SARGENT COMPANY, OF CHICAGO, ILLINOIS, A CORPORATION OF ILLINOIS.

WATER-GAGE.

1,395,062.  Specification of Letters Patent.  Patented Oct. 25, 1921.

Application filed October 4, 1917. Serial No. 194,663.

*To all whom it may concern:*

Be it known that I, GEORGE H. SARGENT, a citizen of the United States, residing at Chicago, in the county of Cook and State of Illinois, have invented certain new and useful Improvements in Water-Gages, of which the following is a specification.

My invention relates to water gages and particularly to the type of inclosed water gages.

Since the advent of water glasses inclosed within a protecting casing the question of affording sufficient protection against breaking of the protecting means by the bursting of the water gage glass and at the same time permitting the replacing of broken gage glasses without impairing the protecting means, has been carefully considered and considerable difficulty has been experienced in securing suitable protecting means to prevent the discharge of the flying glass and steam and which at the same time would afford sufficient protection to the engineman by not breaking. Where the glass panels of the gage are made an integral part of the structure, difficulty has been experienced in replacing the protecting glass panels; while at the same time the removal of the whole gage from the boiler has frequently been necessary, thereby incurring the expenditure of considerable time and labor.

It is the object of my present invention to improve gage glasses of the general type referred to and to overcome the above mentioned objection thereto by the provision of a removable cover means over the glass panels at the same time affording a sufficiently heavy casing to properly support the water glass and the portecting panels.

A further object is to provide a gage glass wherein replacement of the water glass may be made without fracturing any of the component parts of said gage.

A still further object is to provide a novel water gage wherein means are provided for protection against flying glass and steam whenever the water glass breaks, and the provision of suitable means for replacing the broken water glass, together with replacement of the broken protecting means.

A still further object is to provide a water gage which will do away with the general objections to the type of gage wherein the water glass is fixedly secured.

These and other objects will be apparent from the following description and drawings, wherein:

Figure 1 is an elevation of the side of the preferred embodiment of my invention.

Fig. 2 is a vertical sectional view through Fig. 1, and

Fig. 3 is a horizontal sectional view on line 3—3 of Fig. 2.

The usual water glass 5 is suitably connected to the proper members of the boiler for indicating water level, the connections being well known, and hence are not shown in the drawings. The gage embodying my invention comprises a central body portion having preferably two oppositely disposed solid walls 7 and 8 and two side openings formed between these walls as is usual in this type of glass. The central casing is provided with enlarged ends 9, 10 having internally threaded sockets, with which the boiler connections are suitably made. The side walls 7 and 8 are formed preferably integral with the top and bottom ends 9 and 10 so as to provide a solid integral casting. The space between the walls 7 and 8 is sufficient to receive a water glass and to allow a very slight clearance between the surface of the glass 5 and the surfaces of the walls 7 and 8. This is for the purpose of preventing the particles of glass, etc., from gathering sufficient force when the glass is broken to break the protecting panels which are mounted over the sight openings. The width of the walls 7 and 8 is such as to permit a relatively small space between the periphery of the water glass and the inner surfaces of the glass panels which cover said openings.

For covering the sight openings, I prefer to employ relatively thick glass panels 11, 12, substantially rectangular in cross section, the inner and outer surfaces of the panels being flat. It was heretofore considered necessary in a gage of this type to employ as panels covering the sight openings, prisms or pieces of glass having convex outer surfaces as it was believed such surfaces magnified the top of the water column and made the reading of the glass much easier. However, it has been found that convex prisms are unnecessary as by the employment of a circular water glass the top of the water column is very readily ascertained because of the fact that there is a difference in the appearance of the glass below and at the top of the column as may readily be observed by referring to Fig. 1. The width of the water glass in which there is water appears much wider than that which is empty, thus making the dividing line very distinct, apparent and ascertainable at a glance. Therefore, as the convex protecting plates were found unnecessary the provision of substantially rectangular panels is preferable because such are cheaper to make and easier to apply and retain in position. To afford proper seats for the glass panels and also to make a tight joint I employ packing material 13 suitably mounted on the walls 7 and 8, about the sight openings and adapted to contact with the glass panels 11 and 12. For securing the panels to make a water and steam tight joint it is necessary that the panels be held very firmly in position. To accomplish this I provide a pair of metallic castings or side members 14, 15, which are channeled so as to provide shoulders 16 which overlie the outer edges of the glass panels; the channels being preferably of a depth slightly greater than the thickness of the panels 11 and 12 so as to also accommodate the packing material 13 as well as similar packing 17 which is inserted between the edges of the glass panels and the side or cover members 14, 15. The ends of the channels formed in the side members 14 and 15 extend full length of the members and therefore are open at the top and bottom so that the ends of the glass panels 11 and 12 rest against the overlapping enlarged ends 9, 10, of the main body casing. It is not necessary that the glass panels make an exact fit as to their length as the sight openings do not extend the full length of the members 14, 15, as indicated by reference character 18. For securing the cover members 14, 15, in position I form integrally with the side walls 7 and 8, a series of bosses 19 provided with apertures therethrough. For registering with these bosses there are formed on the members 14, 15, corresponding ears 20 provided with registering apertures. The apertures on the cover member 15 are preferably threaded to receive the threaded ends of bolts 21 passing through the ears 20 in the cover member 14 and the bosses 19 and the corresponding ears 20 in the cover 15. The covers 14, 15, may be firmly clamped in position by moving the bolts 21 so that a tight fit is secured.

In such a gage provision of the relatively thick glass panels 11, 12, and the rigid heavy construction of the central casing permits the breaking of the water glass 5 and prevents the broken glass, steam and hot water from escaping from the interior of the water gage. Furthermore, if either or both of the panels 11, and 12 be broken for any reason, they may be easily replaced by removing the cover member 14 and 15 which is a matter of but a few moments' work. As the whole device is a self contained one, it may be readily removed from the boiler connections in a few minutes which removal is sometimes desirable when a boiler is out of commission or being repaired.

For making a tight fit between the boiler connections and the water glass I prefer to employ the novel arrangement disclosed in my co-pending application Serial No. 174,684, which comprises a washer 22 composed of resilient material such as rubber. On the outer surfaces of the washer 22 I prefer to employ gaskets of asbestos or of similar material and provided with lead inserts. The asbestos may be compressed to a great extent without being destroyed, thus serving as a very satisfactory covering for the rubber washer 22, as when the bushings 24 are screwed firmly into place the washer 22 is compressed so that the surfaces of the annular portion bear tightly against the surfaces of the water glass making a tight joint therebetween. At the same time the gaskets 23 are compressed so that their inner annular portions make a tight joint with the water glass. The tight joint made by these gaskets prevents the flowing of the rubber if it should become so heated by the steam and water in the water glass as to be in a condition to flow which condition results very frequently and has heretofore been found very objectionable. I may, however, employ any suitable resilient washer member in place of the one described in my co-pending application above cited.

It will be observed that by the employment of the novel means herein disclosed I have provided a water gage wherein the water glass may be readily replaced when broken; wherein it is possible to prevent the pieces of glass flying and steam from causing any harm to the engineman whenever the water glass breaks; and which structure is a rigid affair that will withstand all the shocks to which a device of this sort is subjected and which because of the rigid construction is adaptable to all sorts of service. I have also provided a water gage wherein the protecting panels are removably associated with the central casing in such manner as to prevent the escape of glass particles and steam and at the same time permit access to the interior of the gage. And further, I have provided means for replacing if desirable, the various members without detaching the whole gage from the boiler connections.

I do not desire to limit my invention to the exact form shown and described as I am aware that such devices are capable of modification and such modifications I consider as coming within the scope of my invention.

I claim:

A water gage, comprising a metallic member of substantial thickness having an elongated slot disposed therethrough intermediate of its ends, the ends being provided with central openings communicating with the slot and having threaded sockets, the opposite sides of said member, intermediate of its ends, being formed with smooth bearing surfaces, a pair of corresponding metallic side members, slotted intermediate of their ends to an extent corresponding with a slot in the first member, adapted to extend flush with opposite sides and have bearing on the bearing surfaces of said first member intermediate of the ends thereof, the inner sides of said pair of members being each formed with longitudinal channels on opposite sides and lengthwise of the slots therein, a relatively thick glass panel arranged with its longitudinal edges in the channels of each side member and disposed across the slots of said members, fibrous lining in said channels arranged on opposite sides of the glass panel, regulable means extending through all of said members whereby said side members are forced into abutting relation with the sides of the first member and the fibrous lining with the glass panels clamped therebetween in steam-tight relation to both sides of each glass panel, a water-glass extending lengthwise of the first member through the central openings in the ends thereof, and means whereby the water-glass is maintained in place in fluid-tight relation with the first member.

Signed at Chicago, State of Illinois, this 2nd day of October, A. D., 1917.

GEORGE H. SARGENT.